(12) United States Patent
Greenbank et al.

(10) Patent No.: US 6,339,302 B1
(45) Date of Patent: Jan. 15, 2002

(54) VEHICLE CONTROL SYSTEM

(75) Inventors: Jonathan M. Greenbank, Holland; John S. Bambini, Kentwood; Scott A. Hansen; Michael A. Supanich, both of Holland, all of MI (US)

(73) Assignee: Prince Technology Corporation, Holland, MI (US)

( * ) Notice: Subject to any disclaimer, the term of this patent is extended or adjusted under 35 U.S.C. 154(b) by 0 days.

(21) Appl. No.: 09/212,180

(22) Filed: Dec. 15, 1998

(51) Int. Cl.[7] .............................. H02P 1/54; H02P 1/00; H02P 1/04
(52) U.S. Cl. ..................... 318/103; 318/546; 318/547; 318/567
(58) Field of Search ................................. 318/103, 653, 318/663, 446, 546–548, 549, 567, 443

(56) References Cited

U.S. PATENT DOCUMENTS

| | | | |
|---|---|---|---|
| 4,289,997 A | * 9/1981 | Jung et al. ................... | 318/113 |
| 4,695,682 A | 9/1987 | Winogrocki ................. | 200/5 R |
| 4,809,180 A | 2/1989 | Saitoh .................... | 364/424.05 |
| 4,857,812 A | * 8/1989 | Mochizuki et al. .......... | 318/443 |
| 4,978,876 A | 12/1990 | Koster ......................... | 310/239 |
| 5,006,744 A | 4/1991 | Archer et al. | |
| 5,015,933 A | * 5/1991 | Watkins et al. .............. | 318/567 |
| 5,019,759 A | 5/1991 | Takemura et al. ........... | 318/466 |
| 5,038,088 A | 8/1991 | Arends et al. | |
| 5,523,664 A | * 6/1996 | Ogasawara ................... | 318/590 |
| 5,789,829 A | 8/1998 | Heesemann | |
| 5,812,399 A | * 9/1998 | Judic et al. ............. | 364/424.05 |
| 5,816,653 A | 10/1998 | Benson ..................... | 297/284.4 |

FOREIGN PATENT DOCUMENTS

| | | |
|---|---|---|
| FR | 2 705 473 | 11/1994 |
| FR | 2 737 686 | 2/1997 |
| FR | 2 759 038 | 8/1998 |

OTHER PUBLICATIONS

Publication "SmartMotor" Brochure, Animatics Corporation, Jan. 1997, No. Author Given.

* cited by examiner

Primary Examiner—Marlon T. Fletcher
(74) Attorney, Agent, or Firm—Foley & Lardner

(57) ABSTRACT

An automobile control system including at least one actuation device having a housing and control circuitry coupled to the housing, where the control circuitry and the housing create a unitary device.

15 Claims, 8 Drawing Sheets

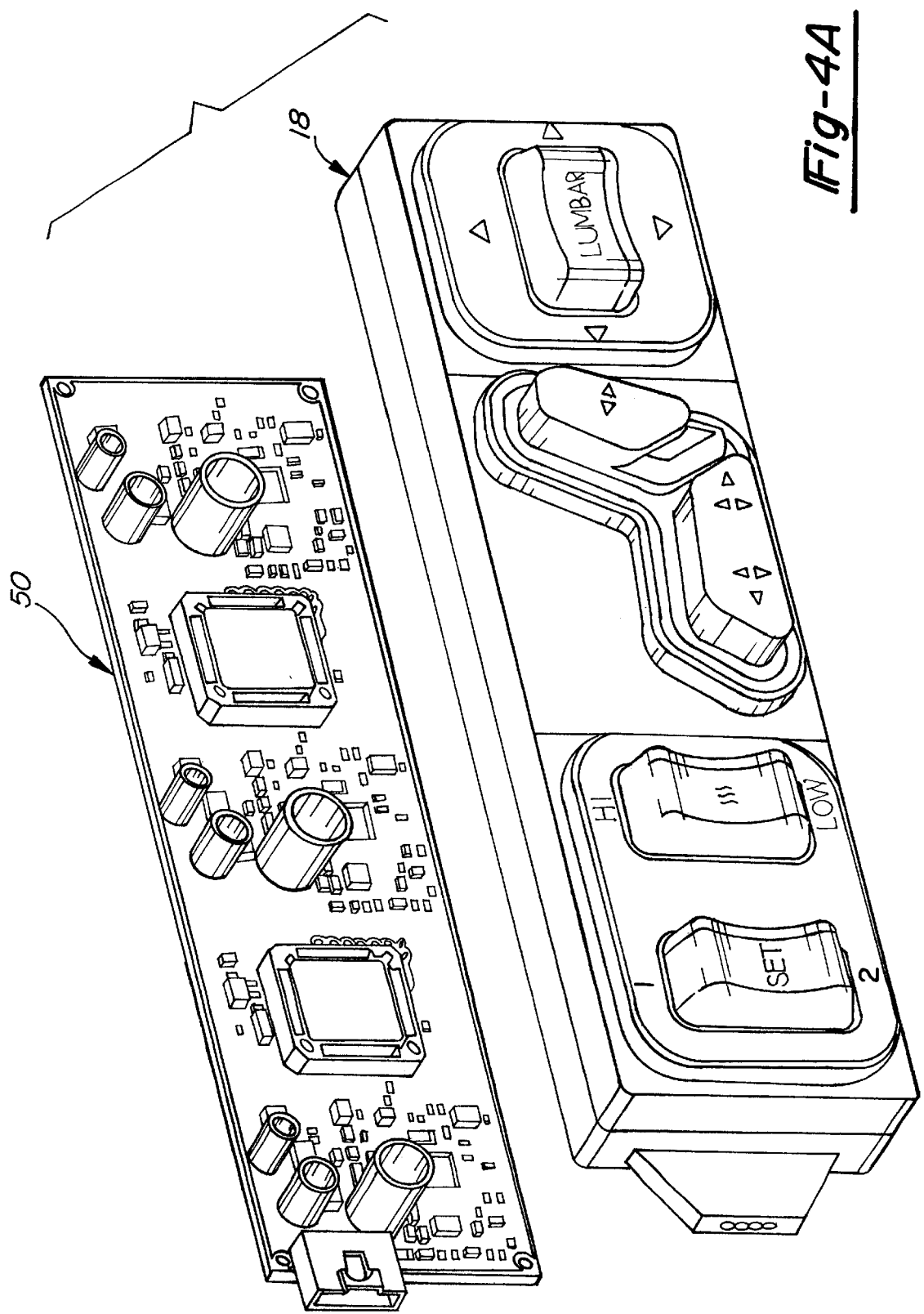

VEHICLE CONTROL SYSTEM

BACKGROUND OF THE INVENTION

The present invention relates to a vehicle control system. More specifically the present invention relates to an electric motor, actuator, or other control device in an automobile having integral control circuitry.

An area in the auto industry seeing tremendous change from past practices is the area of wiring and interconnects. The creation of relatively inexpensive microprocessors, the reduction in size of power components, and the digital revolution have put the power of the computer age into the hands of automotive engineers. Traditionally large bundles of wires were used to conventionally connect electrical devices in automobiles, each wire representing a single switching signal or analog value. These bundles of wires increased the weight, volume, and complexity of the car. With the development of small relatively inexpensive power transistors and the advent of automotive computer networks such as the controller area network (hereinafter "CAN") and SAE J1850, many of these wires and their associated terminations and connectors can be eliminated. Large amounts of information can now be transferred between intelligent control devices in an automobile via a single wire.

In conventional driven applications utilizing an electric motor, numerous components such as drives, controllers, and wiring connections are needed. The motor of choice in most automotive applications, because of its simple construction and the readily available direct current (hereinafter "DC") power from a vehicle battery and alternator, is a DC motor. A DC motor normally comprises a rotating armature and energized field. The rotating armature is usually mechanically commutated with brushes and the energized field is normally created by permanent magnets (although field windings may be used). The speed of the DC motor is related to the applied armature voltage and the torque is related to the applied armature current and field strength. The direction of a DC motor may be changed by merely changing the direction of the motor current in the armature winding(s).

In the past, to control an electrical motor, such as the previously described DC motor, a remote drive or controller would receive power, movement instructions, and sensor signals from the electrical system of a vehicle through numerous wires and connections. The remote controller would further transfer power to an electrical motor and receive feedback from the electrical motor through even more wires and connections. For example, the power relay used with a simple bi-directional DC motor system to switch the direction of the current and thus the rotation of a DC motor would normally be located on the remote controller. A high power connection would have to be made from the automobile electrical system to the remote controller and also from the remote controller to the electrical motor. These high power connections on the remote controller necessitate increased size for connectors on the remote controller and thus an overall increase in size and complexity for the remote controller. Similarly, feedback and control signals, including position, current, and speed from the motor would require additional wiring from the motor to the remote controller. The complexity of such an electrical assembly can lead to wiring errors, improper operation, and require relatively large spaces to incorporate the large wiring bundles. The present invention seeks to eliminate these problems.

SUMMARY OF THE INVENTION

The present invention incorporates control circuitry on a printed circuit board (hereinafter "PCB") coupled to or within a housing for a motor, actuator, or other similar control device to create a unitary apparatus for automotive applications. The control circuitry adds intelligence to the control device and allows it to localize control loops, feedback information, and other signals or actions. Only a single communication connection is needed to receive and transmit control instructions to and from the central control system of an automobile. The incorporation of the control circuitry and housing into a single unit eliminates the large bundles of wires normally used to transfer control signals, replacing them with a single communication wire and power connection.

Moving power components such as high current switching to a motor housing allows remote controllers to become low current devices, reducing the size of the remote controllers and their intricacy. Integrating sensors and other instrumentation with a motor improves the performance of the system and it modularity. The motors of the present invention have integrated current sensing, over current trip, diagnostics, position sensing, and motor speed and direction control. Control and sensor information to and from the motor is transferred by serial bus to the remote controller which is further linked to the central control system in an automobile by another communication system such as CAN or SAE J1850. Thus all control signals may be easily transferred to and from the operator through a simple network of communication wires and not through a bundle of individual control signal wires as done in the past.

The open architecture of the remote controller allows for the addition of more motors or other features such as heat seating or lumbar support movement and massage, without effecting the structure of the basic system. The serial bus from the remote controller may be expanded to include multiple nodes by simply extending the serial wiring Thus by putting intelligence on a motor or other actuation device numerous control wires are eliminated. This is beneficial in the design and engineering of automobile electrical systems due to the limited space available for wire harnesses and electrical connectors.

BRIEF DESCRIPTION OF THE DRAWINGS

FIGS. 4A–4B are perspective views of the present invention's remote controllers illustrating their internal control circuitry;

DETAILED DESCRIPTION OF THE PREFERRED EMBODIMENT

The following description of the present invention is merely exemplary in nature and is in no way intended to limit the invention or its uses. Moreover, the following description, while depicting a control system designed to operate with a DC motor, is intended to adequately teach one skilled in the art to make and use a control system for a variety of motor technologies, including, but not limited to, DC brushless motors, AC motors, and stepper motors.

Figure 1:
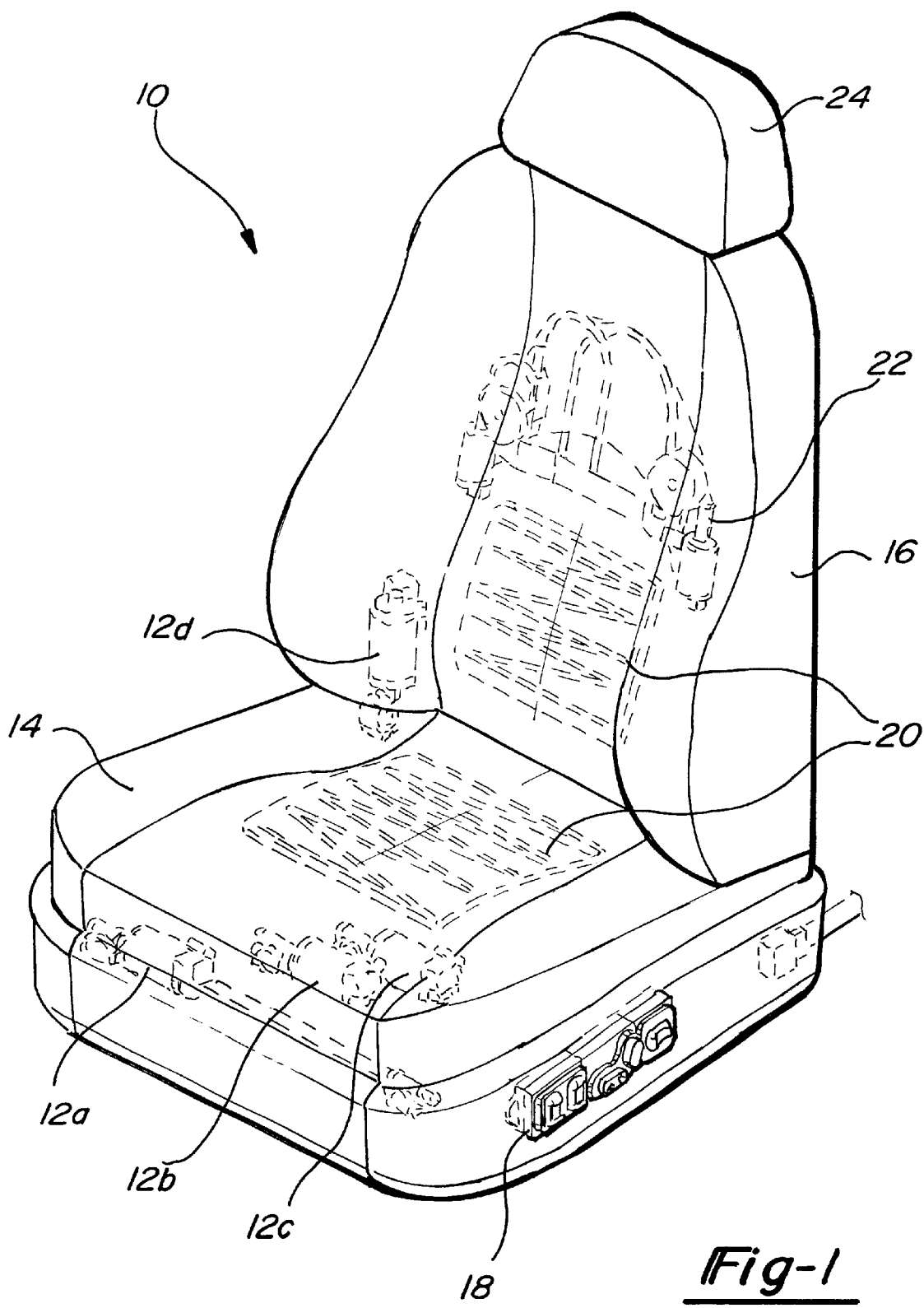
FIG. 1 is a perspective view of a seat containing the control system of the present invention.

FIG. 1 is a perspective view of a seat 10 containing the control system of the present invention. The seat 10 includes a plurality of motors 12a–12d, a lumbar support massage module 22, and seat heaters 20. The motors 12a–12d, generally shown within the seat 10, perform seat actuation functions. The motor 12a controls the fore and aft movement of the seat 10, the motor 12b control the front height of a seat bottom 14, the motor 12c controls the rear height of the seat bottom 14, and the motor 12d controls the tilt of a seat back 16. The speed and torque of each motor 12 has been tailored to the particular seat movement they are executing. The motors 12 contain control circuitry and communicate via a serial link with a remote controller or switching module 18, as will be discussed below. The remote controller 18 in the preferred embodiment is located on the side of the seat bottom 14 to allow easy access by an operator. In addition, to the motors 12, the seat 10 may include other types of actuators. In this regard, FIG. 1 further illustrates the seat heaters 20 and the lumbar support massage module 22 which contains similar controllers and control circuitry as the motors 12 and which are also in serial communication with the remote controller 18. While a motor or actuator is not shown for a headrest 24, a motor may also be present to move the headrest 24 up and down.

Figure 2:
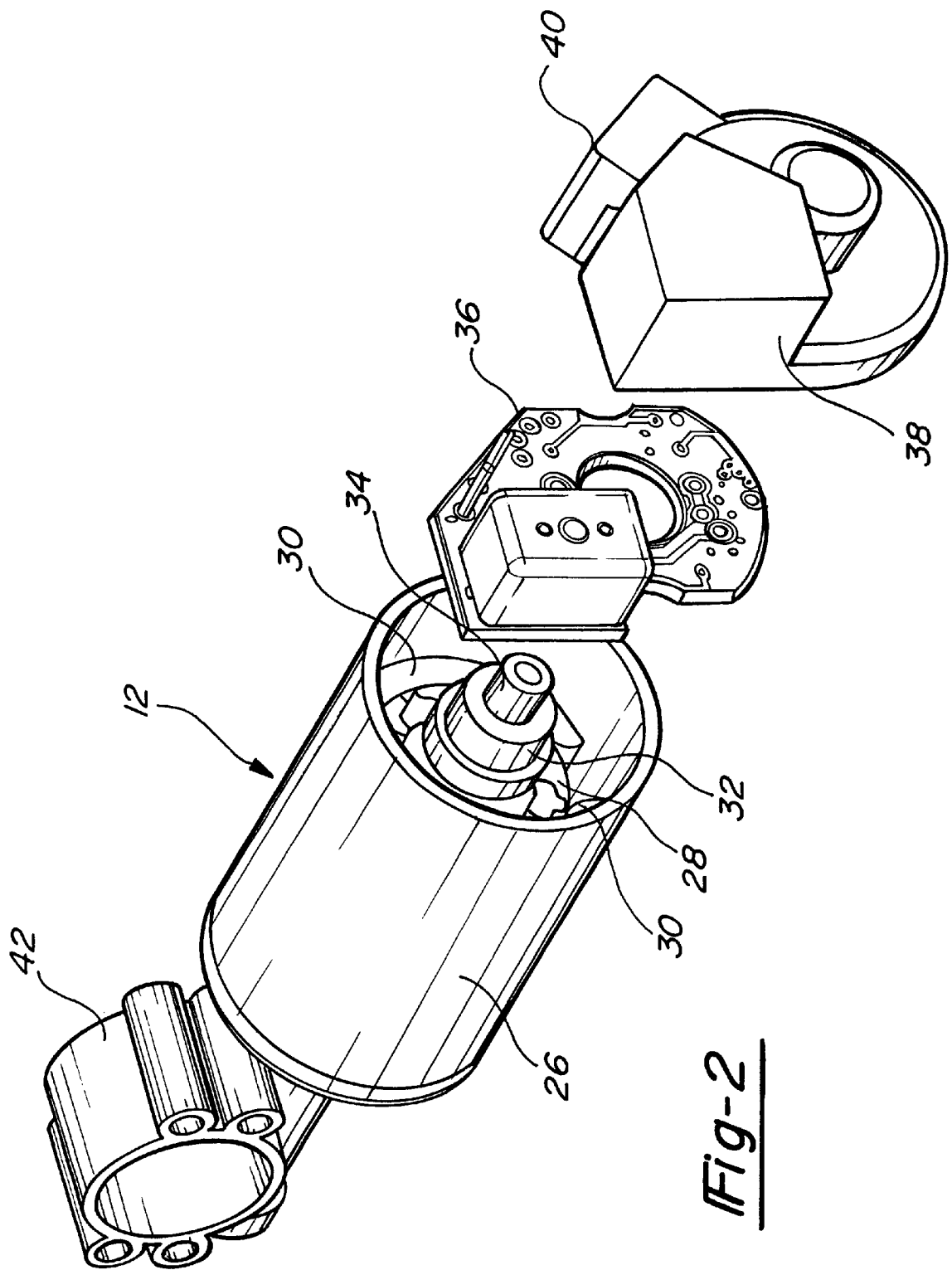
FIG. 2 is an exploded perspective view of the motor of the present invention.

FIG. 2 is an exploded perspective view of one embodiment of the motors 12 of the present invention. The motor 12 includes a housing 26 which encloses a motor armature 28, permanent magnets 30, a motor commutater 32, a motor shaft 34, and any other standard components for a DC motor. A circuit board 36 is coupled to the end of the housing 26 and a motor housing endcap 38 is also coupled to the end of the housing 26 to enclose the circuit board 36 and create a unitary device. Control circuitry on the circuit board 36 is accessed by a junction box 40 located on the motor housing endcap 38. The motor shaft 34 is coupled to a gear box 42 which increases the applied torque of the assembly. In the preferred embodiment, the gear box 42 is a worm gear but may also be a planetary bevel gear, or bevel gear arrangement. In normal operation the motors 12 are run at or near their maximum speed to improve speed regulation and reduce motor size.

Figure 3:
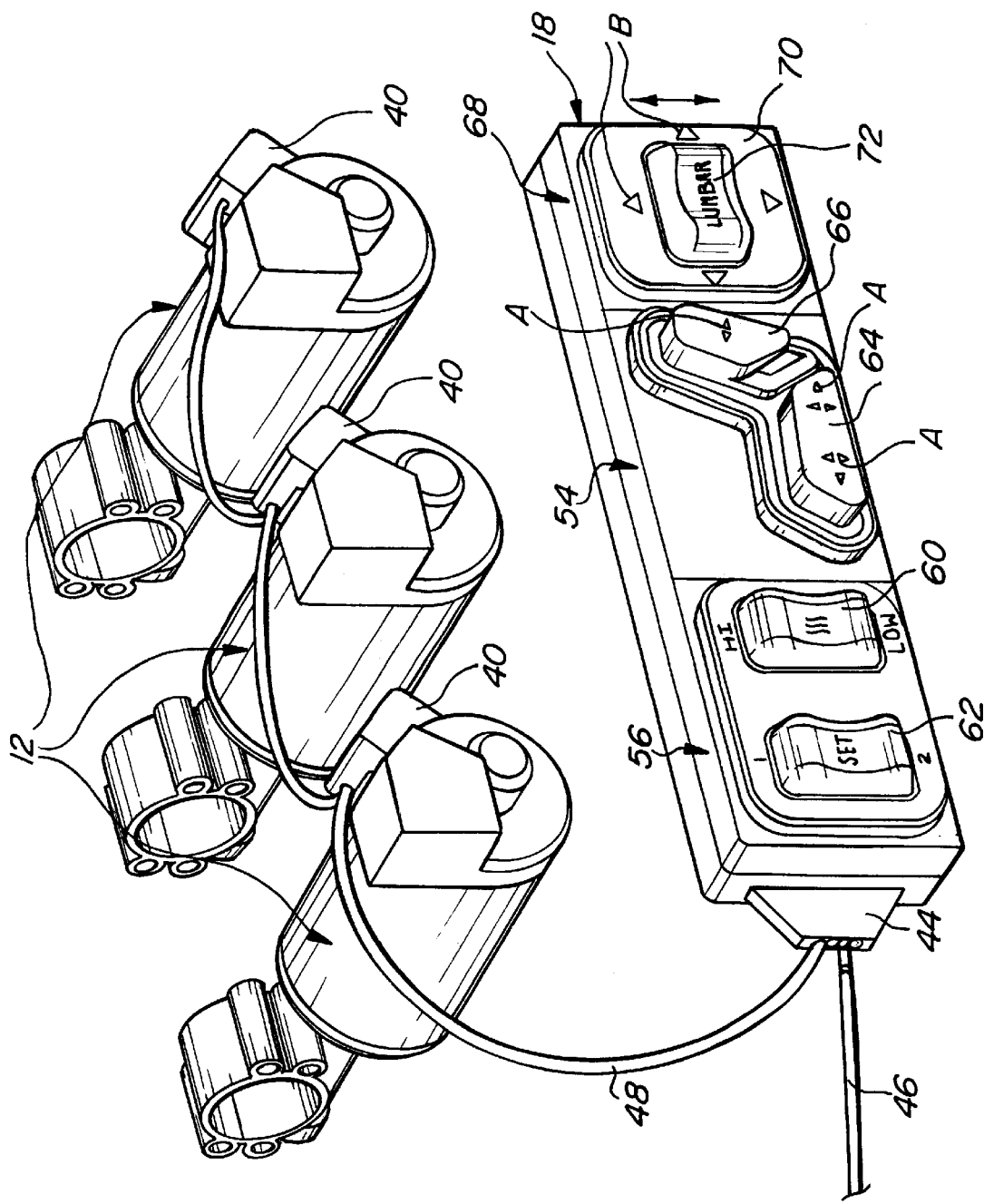
FIG. 3 is a diagrammatic perspective of the control system of the present invention.
Figure 4B:
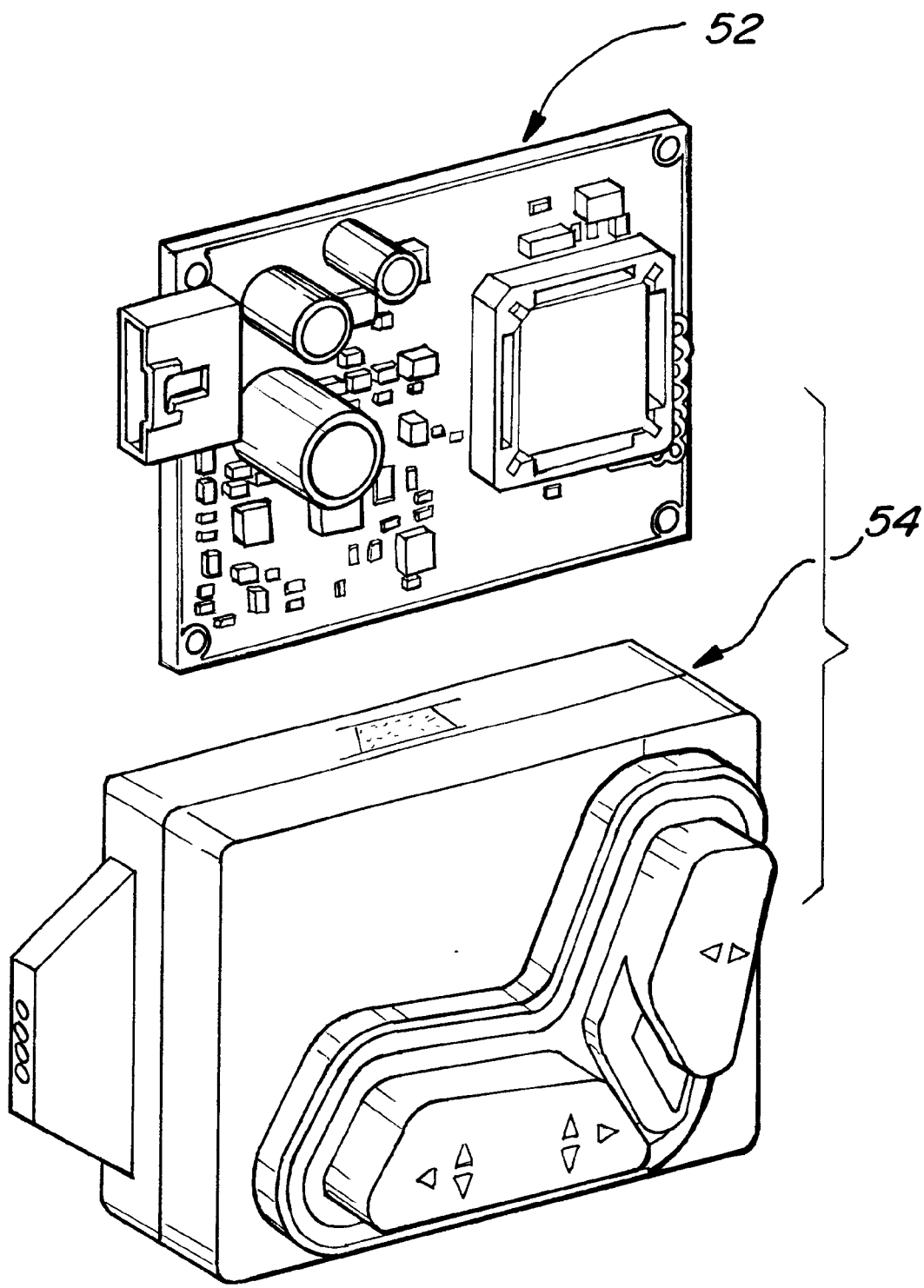

FIG. 3 is a diagrammatic perspective view of the control system of the present invention and illustrates the simple wiring connections between the remote controller or switching module 18 and the motors 12. A terminal strip 44 on the remote controller 18 receives a communications wire 46 from the electrical infrastructure of the automobile to exchange control information with the central control system via CAN, SAE J1850, or other similar communications protocol. A serial communications wire 48 is connected to the terminal strip 44 and daisy chained to each of the motors 12 through terminations in the junction box 40. All control information between the motors 12 and the remote controller 18 is done via the serial communications wire 48 electrically coupled to the circuit board 36 and the circuitry for remote controller 18. FIGS. 4a and 4b illustrate circuitry 50 and 52 located in the remote controllers 18 and 54.

Referring to FIGS. 3, 4a and 4b, the remote controllers 18 and 54 include numerous operator modules and switches which generate control signals to the various control devices. A control module 56 controls the start, stop, and temperature of the heaters 20 and the memory recall for the seat 10 position. In this regard, a switch 60 controls the temperature of the heaters 20 and may be put in an off position, a high temperature position, or a low temperature position. A switch 62 is the memory recall for the desired seat position and may be put in a neutral position, a first stored seat position, or a second stored seat position. As seen in FIG. 3, the remote controller 54 is incorporated into the remote controller 18 as a seat movement control module and includes switches 64 and 66 which control the actuation of the motors 12 and the position of the seat 10. The switch 64 controls the fore and aft position, and the front and rear height of the seat bottom 14. The switch 66 controls the tilt of the seat back 16. The operator may actuate the switches in the direction of the arrows A to achieve the desired seat position. A lumbar control module 68 includes a lumbar movement switch 70 which actuates the lumbar massage module 22 in the directions of the arrows B to assume a desired position on the seat back 16. An additional switch 72 is included to activate the lumbar massage module 22. While the remote controller 18 depicts the three control modules 54, 56, and 68 as a unitary system, the control modules 54, 56, and 68 may also be individually packages as shown in FIG. 4B.

Figure 5:
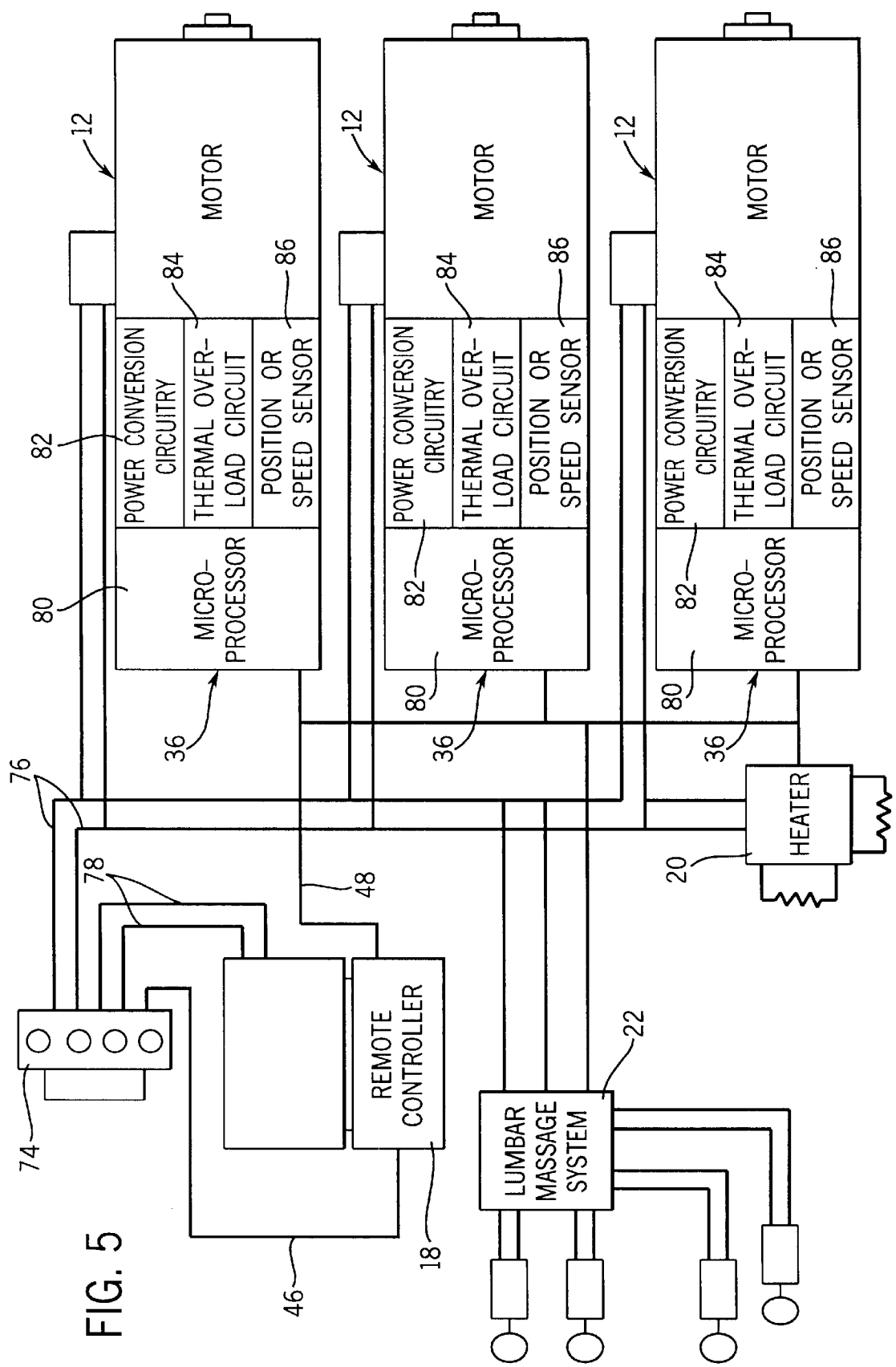
FIG. 5 is a block diagram of the control system of the present invention.

Referring to the drawing of FIG. 5, the power and control connections are depicted in a block diagram. A terminal strip 74 is the termination point for the power and communications wires from the electrical infrastructure of the automobile. High current power wires 76 are connected to the motors 12 and low current power wires 78, sized accordingly, are connected to the remote controller or switching module 18. In previous systems, high current wires would have been connected to the remote controller 18 and an additional high current connection would have been made from the remote controller 18 to the motors 12. By eliminating the need for these large high current wires and connections, the size of the remote controller 18 may be reduced, enabling more flexibility in its packaging and placement in a vehicle. The remote controller 18, as previously discussed, is linked to central control system of the automotive vehicle by the wire 46 and communicates with the central control system of the automobile via the CAN, SAE J1850, or other similar automotive communications standard.

The remote controller 18 serially interfaces with the motors 12 and other locally connected control devices through the serial communications wire 48. The serial communications protocol may be an unbalanced serial signal or a multi-node differential communication protocol such as EIA RS 485. The multi-node serial protocol enables multiple devices to be controlled by the remote controller 18 such as the intelligent motors 12, the intelligent heater 20, the intelligent lumbar massage system 22, or other similar intelligent automotive devices. This reduces the complexity of adding automotive control devices since the remote controller 18 is capable of handling additional nodes by merely extending the serial communications wire 48 to another intelligent device.

The ability to communicate, process information, and respond to sensor input is enabled by the microprocessor and circuitry contained on the circuit board 36. The circuit board 36 will vary in complexity with different applications. Referring to FIG. 5, in a first embodiment of the circuit board 36, a microprocessor 80 with an integral serial communication module will communicate with the remote controller 18. The microprocessor 80 monitors and controls the speed and position of the motor 12 and responds to commands from the remote controller 18 for actuation direction. For example, an operator will activate a switch in the remote controller 18 which gives a position command such as moving a seat cushion in the fore and aft direction, varying the height of a seat cushion, or changing the tilt on a seat cushion. The remote controller 18 will interpret the digital input from the switches as an actuation command and encode this information into a digital frame of information serially transferred to the circuit board 36 via the serial communications wire 48. This packet of information when received by the microprocessor communications module 80 will extract the position command from the digital frame and perform the command.

Power conversion circuitry 82 on the circuit board 36 will include a relay to switch armature current on the motor 12 to change direction. The power conversion circuitry 82 in alternate embodiments will include solid state switching devices such as mosfets to pulse width modulate voltage and current to the motor 12 to control motor speed. High switching speeds for solid state switching devices may contribute to RF noise which is compensated for with chokes and other filtering equipment located on the circuit board 36. The circuit board 36 will further include a current or thermal overload 84 sensor to signal motor loading problems and a position or speed sensor 86.

The current or thermal overload 84 may comprise a positive temperature coefficient (hereinafter "PTC") solid state unit, bimetallic overtemp switch, conventional fusing and circuit breakers, or other overcurrent or overtemp devices known in the art. The position or speed sensor 86 is a Hall effect sensor which is mounted on the motor 12 so that it may be pulsed by the rotations of the motor 12. In alternate embodiments of the present invention, encoders, resolvers, potentiometers, and proximity switching devices may be used to indicate motor speed and position. The circuit board 36 and the microprocessor 80 are also configured to accept numerous other digital and analog inputs from remote sensors within or outside of the motor housing 26.

As discussed previously, the circuit board 36 and the microprocessor 80 enable the system to store and move to desired seat positions when the switch 62 is actuated. The motors 12 may be homed with pulses from the Hall effect sensor 86 and other position sensors stationed along the travel paths of the seat 10. Each motor rotation or sensor 86 pulse will equal an increment of linear movement. In alternate embodiments potentiometer feedback may also be used to store the desired seat positions.

Figure 7:
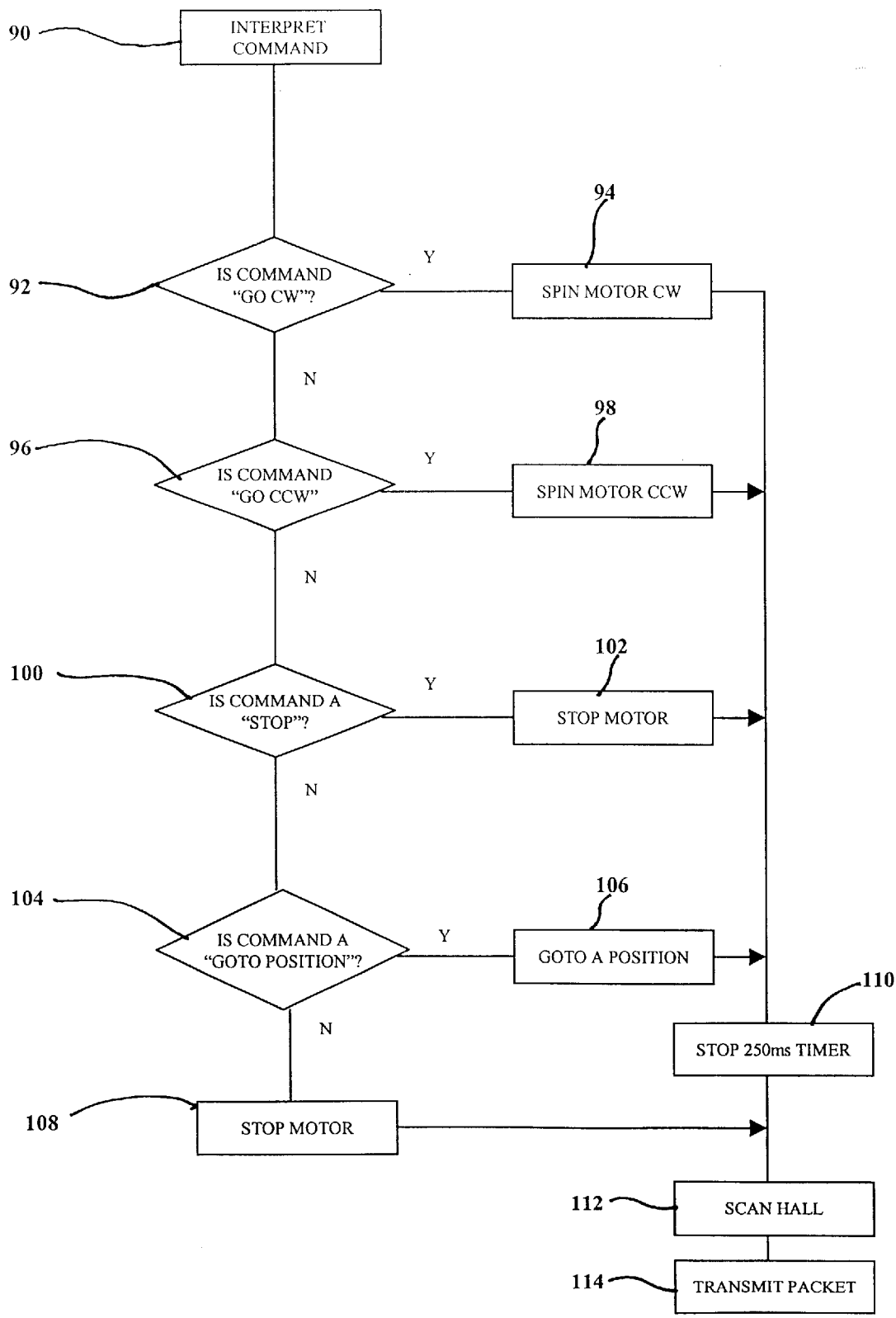
FIG. 7 is a flow chart of the command interpretation done by the microprocessor on the motor of the present invention.

Referring to the flow chart of FIG. 7, the microprocessor 80 on the circuit board will interpret commands from the remote controller 18 to determine the motor 12 actions. Block 90 indicates the start of the interpretation sequence. At block 92 the microprocessor 80 will determine if the motor command is a clockwise rotation and the motor will execute the clockwise rotation at block 94. Moving to block 96, the microprocessor will determine if the motor command is a counter-clockwise rotation and the motor will execute the counter-clockwise rotation at block 98. Continuing to block 100, the microprocessor 80 will determine if the motor has been commanded to stop and the motor will stop at block 102. The last query done at block 104 by the microprocessor is to determine whether the motor command is a position command. If the command is a position command the motor will move to the specified position as shown by block 106. During this loop a timer will be set and stopped at block 110. If no commands have been received by the microprocessor the motor will be stopped at block 108. At step 112 the hall sensor will be scanned and a packet will be transmitted at block 114.

The microprocessor 80 is equipped with nonvolatile memory such as ROM, PROM, EEPROM, any other ROM variant, flash memory, or other similar memory devices which contains the operating system and control parameters for the motors 12. The operating system may be varied for different motor applications and operating parameters. For example, the motor speed may be varied at different points along the movement of a seat and a soft start may be programmed to limit current at the initial actuation of a motor. The motor life may also be extended by monitoring the performance of the motor (temperature, resistance) through sensors.

An additional advantage of the motors 12 of the present invention is that they may be made generic to any actuation application in an automobile. The same motor or at the least the control circuitry may be used for every seat movement application or other actuation assignment. The motors 12 will only need the specific programming tailored for each actuation application to be downloaded to its nonvolatile memory. This is easily done by modifying the non-volatile memory in each circuit board 36 to accept the application specific control parameters.

Figure 6:
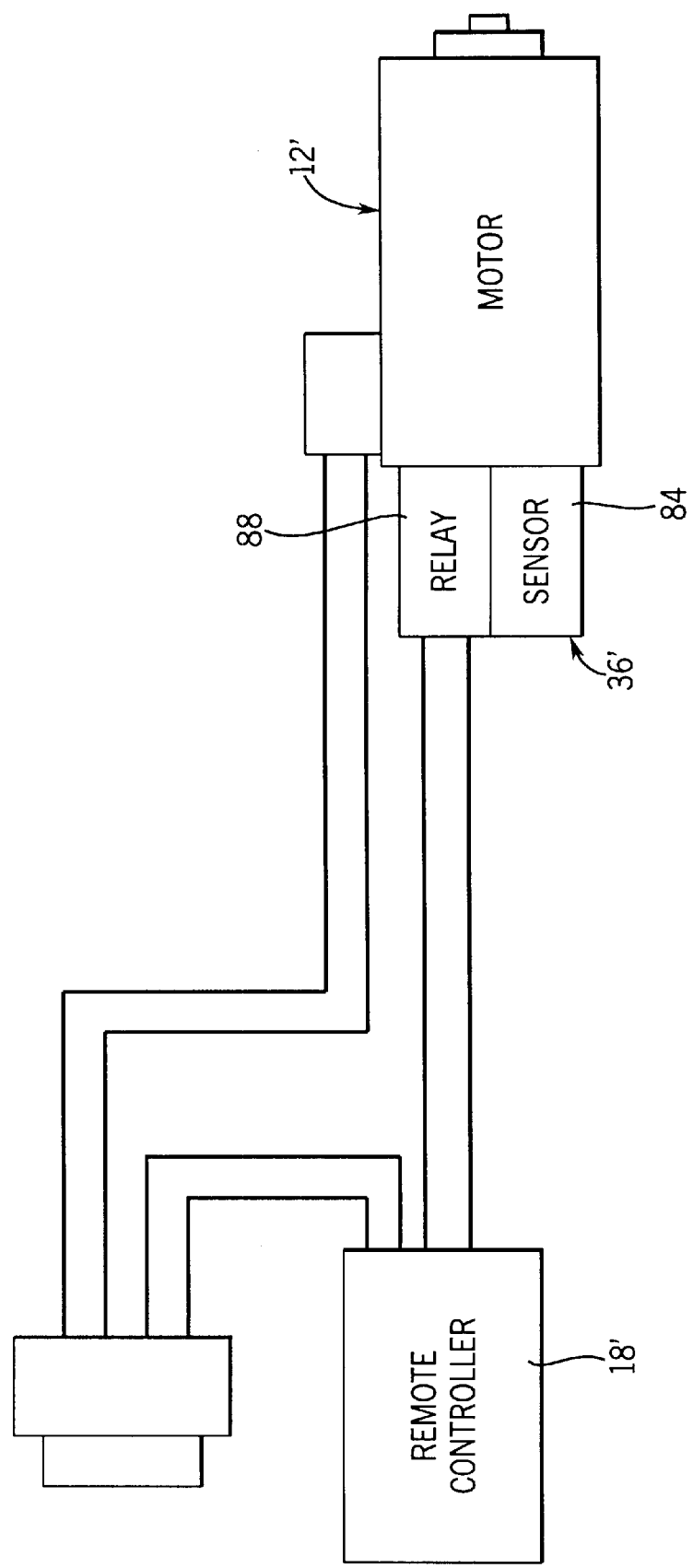
FIG. 6 is a block diagram of a further embodiment of the control system of the present invention.

FIG. 6 is a diagrammatic block diagram of a further embodiment of a control system of the present invention. In this embodiment the motor 12', includes the circuit board 36' which lacks a microprocessor but includes a relay 88 and a sensor 84'. The sensor 84' may be used to sense operational characteristics of the motor 12' such as excessive current or temperature, but may be used to sense other operational characteristics as well. The transfer of the relay 88 from the remote controller 18' to the motor 12' will allow the removal of multiple high current power wires between the remote controller 18' and the motor 12'.

The addition of integral control circuitry and intelligence on a motor, actuator, or other control device gives enormous design advantages and flexibility in the configuration of an internal automotive control system. Software and circuitry may be configured to meet numerous complicated tasks and functions. It will be seen from the description that the above invention allows the motors 12 to perform many advanced functions in an automobile which previously were impractical. The functions include: the ability to locally sense high motor current in a locked rotor condition which occurs when the seat 10 is impinged on an obstruction such as a shopping bag or person; locally controlling speed and position; initiating seat movement locally in response to sensors; tuning of motor switching speed to eliminate audio frequencies which may irritate an operator; and any other application which may be programmed in response to sensor input, motor feedback, and operator input.

The present invention further encompasses a method for controlling seat 10 position in an automobile comprising: sensing physical actuation of the seat position switches 64 and 66 which are physically integrated to the remote controller 18; delivering seat actuation signals by way of the serial communications link 48 to the circuit board 36 on the motor 12; causing said actuation signals to be interpreted by the microprocessor 80 within said circuit board 36 to determine seat actuation commands; and executing the actuation commands by the microprocessor 80.

It is to be understood that the invention is not limited to the exact construction illustrated and described above, but that various changes and modifications may be made without departing from the spirit and scope of the inventions as defined in the following claims.

We claim:

1. An automotive seat control system for controlling the position of a seat, said automotive seat control system comprising:

a first motor operable to change the position of the seat;

a first controller structurally coupled to said first motor, said first controller being operable to control the operation and current polarity of said first motor in response to motor actuation instructions received by said first controller;

a second controller located remote from said first motor, said second controller electrically communicating with said first controller and being operable to generate the motor actuation instructions; and a switch electrically communicating with said second controller, said switch being operable to cause said second controller to generate the motor actuation instructions in response to actuation of said switch;

whereby the position of the seat is changed upon actuation of said switch by causing said second controller to generate and deliver the motor actuation instructions to said first controller.

2. The automotive seat control system as set forth in claim 1, further comprising:

a second motor in electrical communication with said second controller; and a third controller for controlling the operation of said second motor, said third controller being located proximate to said second motor.

3. The automotive seat control system set as forth in claim 1, wherein said first motor includes a housing, said first controller being disposed within said housing.

4. The automotive seat control system as set forth in claim 1, wherein the actuation instructions generated by said second controller are operable to cause fore and aft adjustment of the seat, height adjustment of the seat, and tilt adjustment of the seat.

5. The automotive seat control system as set forth in claim 1, wherein said first controller includes an integral microprocessor.

6. The automotive seat control system as set forth in claim 5, wherein said first controller includes nonvolatile memory to store control parameters.

7. The automotive seat control system as set forth in claim 1, further comprising:

a sensor disposed within said first motor for generating a signal corresponding to an operational characteristic of said first motor; and said first controller being operable to monitor the output of said sensor.

8. The automotive seat control system as set forth in claim 1, wherein said switch is disposed within said second controller.

9. The automotive seat control system as set forth in claim 1, wherein said second controller includes a plurality of seat adjustment switches as well as communication circuitry, said communication circuitry operable to convert signals generated by said seat adjustment switches into a digital form suitable for serial communication with said first controller.

10. An automotive seat control system for controlling a characteristic of a seat, said automotive seat control system comprising:

a first actuator operable to change a characteristic of the seat;

a first controller structurally coupled to said first actuator, said first controller being operable to control the operation of said first actuator in response to actuation instructions received by said first controller;

a second controller located remote from said first actuator, said second controller communicating with said first controller via an automotive network interface, and being operable to generate the actuation instructions; and a switch electrically communicating with said second controller, said switch being operable to cause said second controller to generate the actuation instructions in response to actuation of said switch;

whereby the characteristic of the seat is changed upon actuation of said switch by causing said second controller to generate and deliver the actuation instructions to said first controller.

11. The automobile seat control system as set forth in claim 10, wherein said first controller includes a microprocessor and communication circuitry to enable digital communications with said second controller.

12. The automotive seat control system as set forth in claim 10, wherein said first controller includes nonvolatile memory to store control parameters.

13. The automotive seat control system as set forth in claim 10, wherein said first actuator is a device selected from the group consisting of a motor, a seat heater, and a lumbar support massage module.

14. The automotive seat control system as set forth in claim 13, further comprising a second actuator operable to control another characteristic of the seat, said second actuator being a device selected from the group consisting of a motor, a seat heater, and a lumbar support massage module.

15. The automotive seat control system as set forth in claim 10, wherein said first actuator includes a housing, said first controller being disposed within said housing of said first actuator.

\* \* \* \* \*

UNITED STATES PATENT AND TRADEMARK OFFICE
CERTIFICATE OF CORRECTION

PATENT NO.      : 6,339,302 B1
DATED           : January 15, 2002
INVENTOR(S)     : Greenbank et al.

It is certified that error appears in the above-identified patent and that said Letters Patent is hereby corrected as shown below:

<u>Title page,</u>
Item [57], please delete the four-line Abstract and insert therefor -- An automotive seat control system for controlling the position of a seat includes a first motor, first and second controllers, and a switch. The first motor is operable to change the position of the seat. The first controller is structurally coupled to the first motor. The first controller is operable to control the operation and current polarity of the first motor in response to motor actuation instructions received by the first controller. The second controller, located remote from the first motor, electrically communicates with the first controller and is operable to generate the motor actuation instructions. The switch is operable to cause the second controller to generate the motor actuation instructions in response to actuation of the switch. The position of the seat is changed upon actuation of the switch by causing the second controller to generate and deliver the motor actuation instructions to the first controller. --

<u>Column 8,</u>
Line 30, please delete "automobile" and insert therefor -- automotive --.

Signed and Sealed this

Thirteenth Day of August, 2002

*Attest:*

*Attesting Officer*

JAMES E. ROGAN
*Director of the United States Patent and Trademark Office*